United States Patent
Rosset

(10) Patent No.: US 8,370,827 B2
(45) Date of Patent: Feb. 5, 2013

(54) METHOD AND DEVICE FOR THE CONTROLLED EDITING AND BROADCASTING OF COMPRESSED MULTIMEDIA FILES

(75) Inventor: Alain Rosset, Lyons (FR)

(73) Assignee: UBICMEDIA, Lyons (FR)

( * ) Notice: Subject to any disclaimer, the term of this patent is extended or adjusted under 35 U.S.C. 154(b) by 96 days.

(21) Appl. No.: 12/513,614

(22) PCT Filed: Nov. 6, 2007

(86) PCT No.: PCT/FR2007/001826
§ 371 (c)(1),
(2), (4) Date: Jun. 18, 2009

(87) PCT Pub. No.: WO2008/065275
PCT Pub. Date: Jun. 5, 2008

(65) Prior Publication Data
US 2010/0063984 A1 Mar. 11, 2010

(30) Foreign Application Priority Data

Nov. 6, 2006 (FR) ..................................... 06 09664

(51) Int. Cl.
*G06F 9/44* (2006.01)
*G06F 9/455* (2006.01)

(52) U.S. Cl. ............ 717/168; 719/322; 913/1; 717/174; 717/170; 717/175

(58) Field of Classification Search .................... 707/803
See application file for complete search history.

(56) References Cited

U.S. PATENT DOCUMENTS

| | | | |
|---|---|---|---|
| 6,931,534 B1 | 8/2005 | Jandel et al. | |
| 2006/0280479 A1* | 12/2006 | Mita et al. | 386/96 |
| 2007/0128899 A1* | 6/2007 | Mayer | 439/152 |
| 2007/0162568 A1* | 7/2007 | Gupta et al. | 709/219 |

FOREIGN PATENT DOCUMENTS

| | | |
|---|---|---|
| FR | 2 812 147 A | 1/2002 |
| GB | 2 397 201 A | 7/2004 |
| WO | WO-00/31964 A | 6/2000 |
| WO | WO-00/49597 A | 8/2000 |
| WO | WO-01/69354 A2 | 9/2001 |
| WO | WO-02/47352 A | 6/2002 |

* cited by examiner

*Primary Examiner* — Don Wong
*Assistant Examiner* — Mohammad Kabir
(74) *Attorney, Agent, or Firm* — Harness, Dickey & Pierce, P.L.C.

(57) ABSTRACT

The present application relates to a method for editing and broadcasting compressed multimedia files composed of binary data blocks originating from digital transformations applied to an audiovisual or multimedia content according to the format of a parent file, said parent file having been separated into a first modified file having the format of the nominal parent file and into a complementary file including information on the modifications brought to the parent file, the method comprising prior to the transmission from a portal to the receiving terminal:

- a step of preparation including analyzing said first file for extracting time-codes therefrom,
- a second step including generating an index register table from said first modified file,
- a third step including generating a modified multimedia file according to the format of the parent file containing information of said first modified file and meta-data,
- a step of transmission of said modified multimedia file separate from said modified multimedia file, the elements of said complementary file making it possible to recreate a partial synthesis of the original audiovisual file.

18 Claims, 3 Drawing Sheets

METHOD AND DEVICE FOR THE CONTROLLED EDITING AND BROADCASTING OF COMPRESSED MULTIMEDIA FILES

CROSS REFERENCE TO RELATED APPLICATIONS

This application is a National Phase Entry of International Application No. PCT/FR2007/001826, filed Nov. 6, 2007, which claims priority to French Application No. 0609664, filed Nov. 6, 2006. Both of these applications are incorporated by reference herein.

BACKGROUND AND SUMMARY

The present invention relates to the controlled editing and broadcasting of any audiovisual and multimedia file and content, by and to authorized users and provides a method and a system for the controlled editing and broadcasting of audiovisual and multimedia files and contents.

The general issue is to provide a device able to controllably diffuse compressed digital audiovisual and multimedia files of the MPEG type for video, JPEG type for still images or MP3 type for audio, to authorized users, and to enable them to edit said files by creating new audiovisual and multimedia files from one or several extracts of one or several independent audiovisual and multimedia files. With the present solutions, it is possible to transmit multimedia contents in a digital form via any network type. To avoid the hacking of thus diffused fluxes, said contents are often encrypted by various means which are well known to the persons skilled in the art.

However, the main drawback of the current solutions consists in that it is necessary to transmit not only the encrypted contents to the users, but also the decryption keys or the utilization licenses to the user terminal, so as to enable the execution of said contents. If the utilization licenses did not take into account the fact of being able to extract a predefined part of a content to edit it or to combine it with another predefined extract of the same, or of another content, after the encryption of the contents, this functionality cannot generally be performed. Thus, the present real time broadcasting solutions (streaming) or downloading solutions have major drawbacks such as the impossibility of editing said contents if they are protected by extremely efficient licenses or, on the contrary, they provide a malevolent user the possibility of making non authorized copies of the thus diffused contents if the encryption methods are not sufficient enough. Another drawback of the downloading is that it requires the complete downloading of the file even though a user wishes to see only one extract thereof, or start at another moment than the beginning of the file.

Under these conditions, a solution consists in separating the parent digital file into two parts, none of which could be used alone. With this idea in mind, several patents have been filed. Thus, it is known from document WO 01/69354 A3 (Microsoft Corporation) which discloses a system protecting a digital product (software or audio or video content using an encryption, by breaking it down into at least two portions. Both portions are encrypted after the separation and wholly and integrally transmitted to the user equipment through separate ways. The recombination of both parts on the receiving equipment is carried out using keys, which recreate a modified digital product which is substantially equivalent to the original product and which is appropriate only for this user equipment. This system recombines both parts to create a new digital product and thus cannot guarantee that said new digital product cannot be edited to make an extract thereof since the whole digital product is recreated by a given machine. This system does not allow the assembling of extracts either.

In the state of the art solutions are also known, making it possible to edit an audio file by dividing it into at least two segments and by retrieving therefrom one or several segments of the file. The application of patent WO 00/49597 was filed with this idea in mind and provides a method for encrypting data characterised in that it provides a set of sounds, retrieves one or several segments from the set to make a specific file, provides a decryption key, encrypts the specific file and communicates said encrypted specific file on a first communication channel and the retrieved segments on a second communication channel. The drawback of such a solution lies in the impossibility to control the utilization of the transmitted specific file. The lawful or fraudulent holder or the decryption key can use the file unconditionally and permanently. The issue of controlling the free flow of multimedia files on a network is not solved yet.

In order to remedy these various defects, the invention provides to enable the holder of rights to freely diffuse and to put on line his or her audiovisual and multimedia contents with maximum comfort and reading quality for the user of a terminal, independently from the rate of his or her connection to the telecommunication network. The invention also aims at enabling a user to read some extracts, to edit said extracts and to assemble them into a new audiovisual and multimedia file which can be broadcast within the limits of the holder's rights.

For this purpose, the invention relates to a method for editing and broadcasting compressed multimedia files composed of binary data blocks originating from digital transformations applied to an audiovisual or multimedia content according to a format of a parent file, said parent file having been divided into a first modified file having the format of the nominal parent file, and into a complementary file including information on the modifications brought to said parent file, characterised in that it includes, prior to the transmission from a portal to a receiving terminal:
  a step of preparation consisting in analyzing said first file to extract time-codes therefrom,
  a second step consisting in generating an index register table from said first modified file,
  a third step consisting in generating a modified multimedia file according to the format of the parent file containing information on said first modified file and meta-data,
  a step of transmission:
  of said modified multimedia file, and
  by means separate from said multimedia file, the elements from said complementary file making it possible to recreate a partial synthesis of the original audiovisual file, from the calculations on the receiving terminal, as a function of said modified multimedia file and the elements of said complementary file.

Advantageously, the referencing of said complementary file is generated during said second step. Advantageously, said meta-data of said third step contain said time-codes from said step of preparation. Advantageously, said meta-data of said third step containing said referencing of said complementary file. Advantageously, said meta-data from said third step contain said index register table.

In a particular embodiment, the whole or a part of said modified multimedia file is sent by a portal. Advantageously, the whole or a part of said modified multimedia file is sent by another terminal. Advantageously, the whole or a part of said modified multimedia file is sent by a physical medium.

In another embodiment, said portal decides which elements of said complementary file are to be sent to said receiving terminal, as a function of the characteristics of said terminal. Advantageously, said portal decides which elements from said complementary file are to be sent to said receiving terminal, as a function of the utilization conditions imparted by the holder of the rights on said parent file. In a particular embodiment, said partial synthesis of the recreated content is executed upon reception of the first information of said modified multimedia file 34 and the first elements from said complementary file 33. In another embodiment, said modified multimedia file is edited to create an extract of said modified multimedia file.

Advantageously, several extracts of modified multimedia files are assembled to create a new modified multimedia file. Advantageously, said extracts of modified multimedia files originate from only one modified multimedia file. Advantageously, said extracts of modified multimedia files originate from several modified multimedia files.

Eventually, the invention relates to a system for the transmission of a compressed audiovisual file for the implementation of the method, characterised in that it includes equipment for producing one modified multimedia file, at least equipment for operating an audiovisual flow between the production equipment and the operating equipment. Thus, the invention enables a total control of the utilization of copies and the conditions of utilization thereof, these conditions being imparted by the holder of rights on the parent content, of new files and audiovisual and multimedia contents thus broadcast or edited.

BRIEF DESCRIPTION OF THE DRAWINGS

The present invention will be better understood upon reading the description of a non limitative exemplary embodiment which follows, and referring to the appended drawings, wherein.

DETAILED DESCRIPTION

Figure 1:
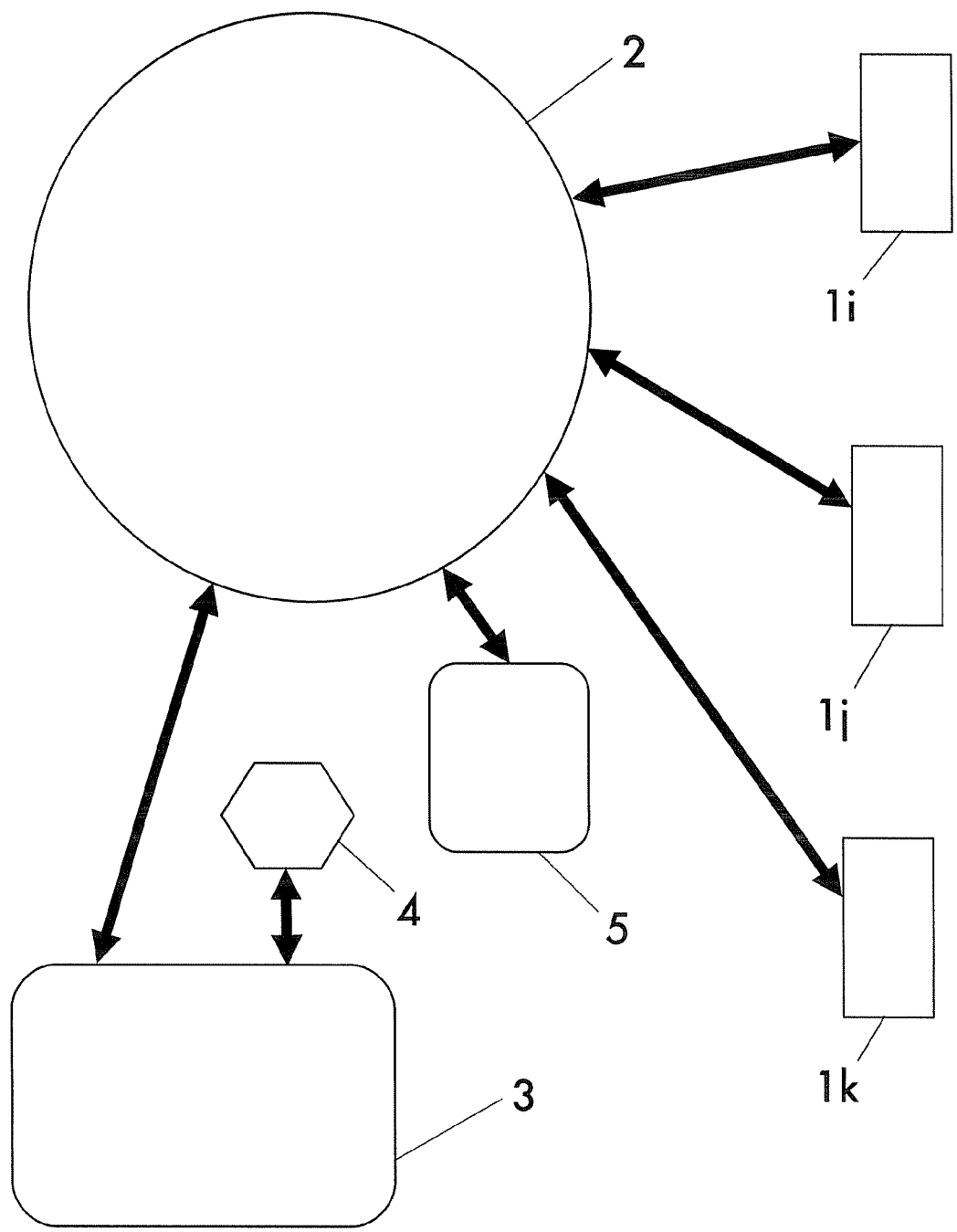
FIG. 1 describes the general architecture of a system for the implementation of a method according to the invention.

In FIG. 1, when the user of a terminal $1i$, $1j$, $1k$ wishes to see an audiovisual content, he/she makes a request to the portal 3 through the telecommunication network 2. Said portal 3 then decides to send or not the complementary element corresponding to the corresponding audiovisual and multimedia content.

Figure 2:
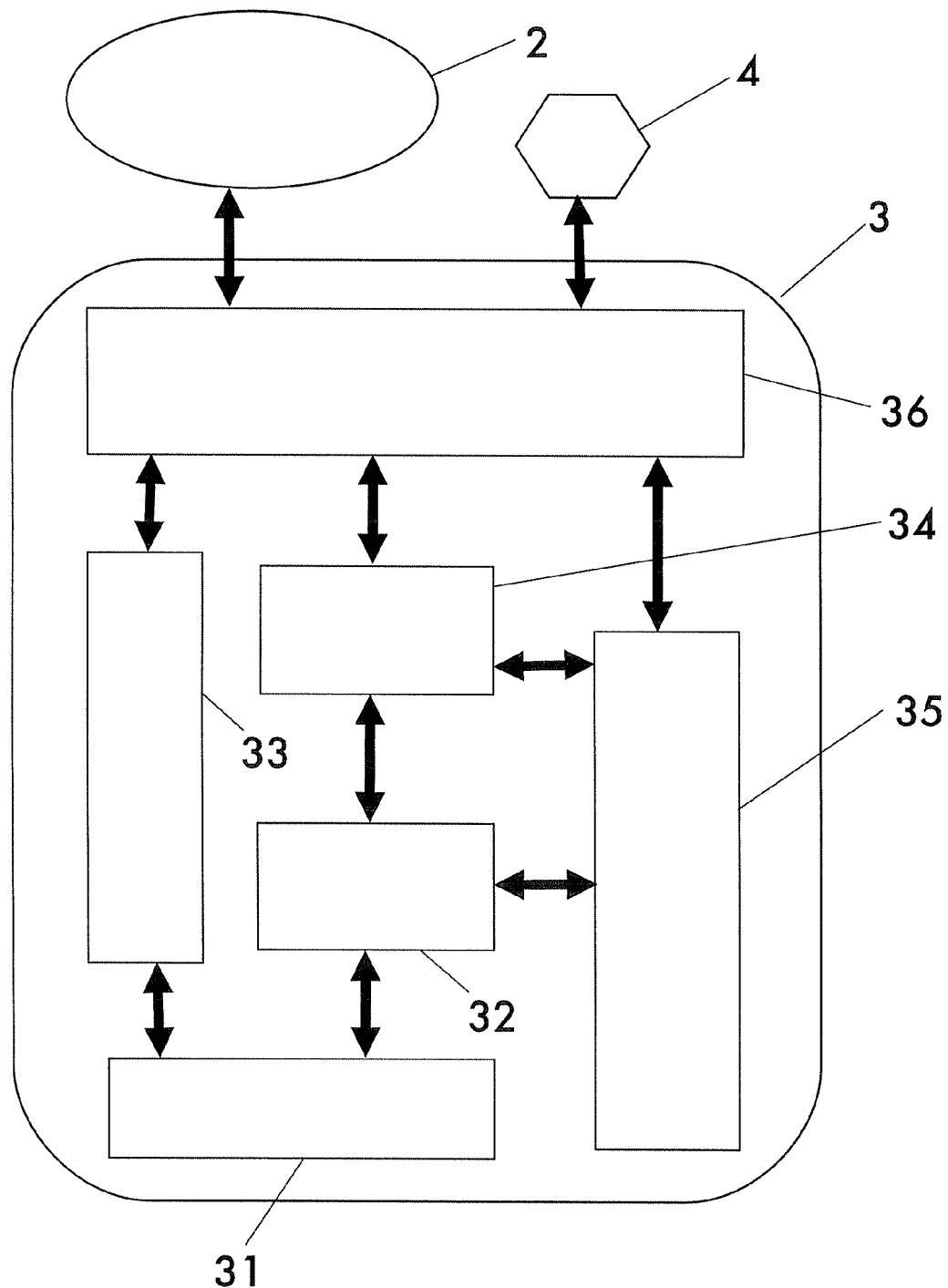
FIG. 2 describes the architecture of the portal according to the invention.

Prior to this phase, the parent audiovisual and multimedia content 31 has been prepared by the portal 3, as shown in FIG. 2. Each audiovisual file 31 is shown in a compressed digital form and is composed of binary data blocks originating from digital transformations applied to an audiovisual and multimedia content according to the format of a parent file. The original format of a parent content 31 is for example a file with an original format MPEG-2, MPEG-4 or H264 for video or with an original format MP3 or AAC in the case of audio files, or in the original format JPEG in the case of still images or photographies files.

The parent content 31 is first divided into at least two parts, a first modified file of which 32 has the format of a nominal parent file and into a complementary file 33 having any format and including information on the modifications brought to said parent file 31. The recreation of the parent file 31 can be done only from both files 32 and 33 and not from only one of them.

During a first step, said first modified file 32 is analyzed by the portal 3 so that the time-codes corresponding to the time indexes of the file 32 can be extracted. Advantageously, said parent file 31 is analyzed by the portal 3, so that the time-codes corresponding to the time indexes of the file 32 can be extracted.

In a second step, said time-codes are combined with indexes or keywords, so as to generate an index register table 35. This index register table 35 corresponds to a table of contents and includes for example a sequence of registers, each containing indexes and the time-code or time-codes of the beginning of the sequence in the modified file 32, and consequently the beginning of the sequence in the modified multimedia file 34. For example, if a portal 3 contains a set of animal films, one of the indexes of the index register table 35 is composed of a sequence of registers which "point" at all the parts of contents dealing with a given subject, for example "leopards". The user of a terminal $1i$, $1j$, $1k$, etc. who wishes to see one or several films or extracts of films dealing with "leopards" will use this index register table 35 to have access to all the parts of contents dealing with "leopards". In a third step, said time-codes extracted during the first step are noted in the meta-data of a new file called the modified multimedia file 34.

In another embodiment, the referencing of said complementary file 33 is inscribed in said meta-data of said modified multimedia file 34. The referencing of said complementary file 33 corresponds for example to the URL address in a portal 3 of said complementary file 33. In another embodiment, said meta-data of said modified multimedia file 34 contain the conditions of utilization imparted by the holder of said parent file. Advantageously, said meta-data of said modified multimedia file 34 contain the conditions of utilization imparted by the holder of the rights on said parent file. Said holder is for example a broadcaster which holds the rights for the distribution and broadcasting of said parent file.

In another embodiment, said modified multimedia file 34 is a file of the HTML or XML type, which encapsulates said first modified file 32 and the time-codes corresponding to the time indexes of the file 32. Advantageously, said index register table 35 is also encapsulated in said modified multimedia file 34. In another embodiment, said modified multimedia file 34 is a file having the same format as the parent format of the modified file 32 and which contains said modified file 32 as well as said time-codes and the referencing of said complementary file 33 in its meta-data. Advantageously, said index register table 35 is also inscribed in said meta-data of said modified multimedia file 34.

Following such steps of processing the multimedia contents, said modified multimedia files 34 are freely transmitted and broadcast to the terminals 1 through the telecommunication network 2, via the interface 36. Advantageously, said modified multimedia files 34 are freely transmitted and broadcast by any exchange network such as for example a community social or P2P network. Advantageously, said modified multimedia files 34 are freely transmitted and broadcast by physical media 4 such as for example DVDs, CD-ROMs, or any other memory of the USB or hard disk type, etc. Advantageously, said modified multimedia files 34 are freely transmitted and broadcast on one or several conventional audiovisual and multimedia servers 5, so as to place said modified multimedia files 34 at the disposal of a great number of terminals 1.

Figure 3:
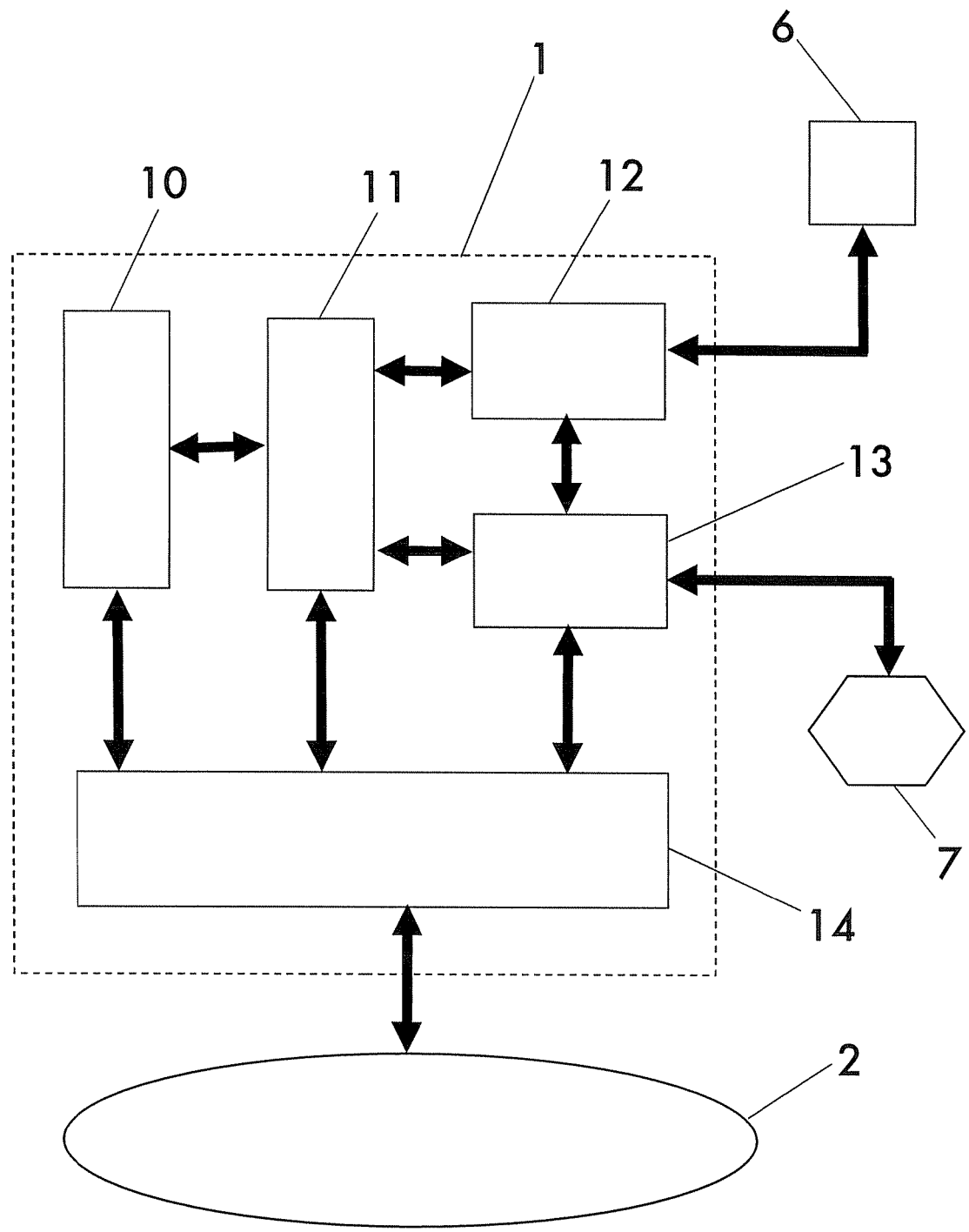
FIG. 3 shows a particular embodiment of a receiving terminal according to the invention.

The multimedia contents are now available for the users 1*i*, 1*j*, 1*k*, etc. When the user of a terminal 1 wishes to see or listen to an audiovisual content, he or she conventionally logs in to the audiovisual server 5 through the network 2. The user of the terminal 1 scrolls the menu via his or her interface 6, he or she selects a content he or she wishes to consume and the modified multimedia file 34 corresponding to this film is transmitted by the server 5 to the terminal 1. Said interface 6 is for example composed of a screen, loud speakers, a keyboard, a mouse etc. Said modified multimedia file 34 is recorded by the interface 14 in FIG. 3 into the memory 10 composed of a hard disk or any other mass storage type.

As from the connection between said terminal 1 and said server 5, the play-back unit 11 plays the meta-data of said modified multimedia file 34 and more particularly the referencing of said complementary file 33. The terminal 1 then connects to the portal 3 in a client/server mode. Said portal 3 then checks that the user is authorized to consume said modified multimedia file 34 and act in such a way that the conditions of the utilization of the holder are complied with. The portal 3 then transmits, in a synchronized way, the elements of the complementary file 33 to the play-back unit 11 which recreates a partial synthesis of the original audiovisual file from the calculation on the receiver terminal 1, as a function of said modified multimedia file 34 and the elements of said complementary file 33. Said partial synthesis of the original audiovisual content is then displayed on the screen 6 via the interface 12.

Advantageously, said partial synthesis of the recreated content is carried out as from the reception of the first information on said modified multimedia file 34 and the first elements from said complementary file 33. Advantageously, said synthesis of the recreated content is recorded under the control of the portal 3 into the memory 10 of the terminal 1. Advantageously, said synthesis of the recreated content is recorded under the control of the portal 3 on a physical medium 7 such as a DVD, a CD-ROM, a USB memory device, etc.

In a particular embodiment, the user requests the play-back unit 11 to save an extract of the content between two moments t1, t2 which he/she marked through its interface 6. The play-back unit 11 edits the meta-data and the time-codes of the beginning t1 and the end t2 of said extract, to record them into a new partial modified multimedia file 13 having the same characteristics as the original modified multimedia file 34. Said new partial modified multimedia file 13 thus contains an extract of the original modified multimedia file 34 between times t1 and t2.

Advantageously, the times t1 and t2 corresponding to the beginning and the end of the modified parent content 34. Said new modified multimedia file 13 thus contains the whole of the parent modified multimedia file 34. Advantageously, the partial synthesis of the recreated content between times t1 and t2 is recorded under the control of the portal 3 into the memory 10 of the terminal 1. Advantageously, the partial synthesis of said content recreated between times t1 and t2 is recorded under the control of the portal 3, on a physical medium 7 such as a DVD, a CD-ROM, a USB memory, etc. Advantageously, said modified multimedia file 13 is recorded on the physical medium 7 like a DVD, a CD-ROM, a USB memory, etc.

In another embodiment, the user requests to consume said modified multimedia file 34 only from time ti, said time t1 having been selected by the user from the index register table 35 displayed on his or her screen 6. Said user can thus immediately consume said audiovisual content without having to wait for the downloading of said modified multimedia file 34 from the beginning thereof until time ti. The portal 3 downloads to said user's terminal 1 only the part of the modified multimedia file 34 beginning at time ti up to time tj, as defined by the user's stop signal. In another embodiment, the user of a terminal 1 selects any time for the beginning of the viewing ti on a time-code scale.

When the user of the terminal 1 wishes to consume the content corresponding to said modified multimedia file 13, his or her terminal is automatically connected to the portal 3 in a client/server mode. Said portal 3 checks that the user 1 is authorized to consume said modified multimedia file 13, and acts in such a way that the holder's conditions of utilization are complied with. The portal 3 then transmits in a synchronized way the elements of the complementary file 33 to the play-back unit 11 which recreates the partial synthesis of the original audiovisual file from the calculation on the receiving terminal 1 as a function of the part of said modified multimedia file 13 and the elements of said complementary file 33 transmitted by said portal 3. Said partial synthesis of the original audiovisual content is then displayed on the screen 6 via the interface 12.

Advantageously, the partial synthesis of said recreated content is recorded under the control of the portal 3 into the memory 10 of the terminal 1. Advantageously, the partial synthesis of the recreated content is recorded under the control of the portal 3 on a physical medium 7 like a DVD, a CD-ROM, a USB memory, etc. Advantageously, the whole or a part of said modified multimedia file 13 is recorded on a physical medium 7 like a DVD, a CD-ROM, a USB memory, etc.

In another embodiment, a user of the terminal 1*i* transmits a copy of the whole or a part of said modified multimedia file 13 to another terminal 1*j*, 1*k*. In another embodiment, a user of a terminal 1 edits and assembles a set of modified multimedia files 13 for creating a new modified multimedia file 13. Said new modified multimedia file 13 can then be used and broadcast like any other modified multimedia file 13.

Advantageously, said modified multimedia files 13 thus edited and assembled are generated by the same modified multimedia file 34. Advantageously, said modified multimedia files 13 which are thus edited and assembled originate from several modified multimedia files 34.

The present invention is not limited to the preferred described implementation because of this characteristic and as shown in the appended Figures, but modifications can be brought or equivalents can be used without affecting the scope of the invention.

The invention claimed is:

1. A method comprising:
at a server device that includes a non-transitory tangible computer-readable medium, creating, from a parent compressed multimedia file having a first format, (i) a first multimedia file having the first format and (ii) a complementary file, wherein:
the complementary file includes information on modifications made to the first multimedia file, and
creating the first multimedia file includes modifying the parent compressed multimedia file in such a manner that the first multimedia file is rendered unusable without the complementary file;
at the server device, extracting time-codes from the first multimedia file;
at the server device, generating a second multimedia file having the first format and including (i) metadata including the time-codes and a uniform resource identifier (URI) of the complementary file and (ii) the first multimedia file;

transmitting a portion of the second multimedia file from the server device to a first terminal device that includes a non-transitory tangible computer-readable medium, wherein the portion of the second multimedia file includes some or all of the second multimedia file;

at the first terminal device, disseminating the portion of the second multimedia file to a second terminal device that includes a non-transitory tangible computer-readable medium;

at the second terminal device, requesting access to the complementary file from the server device, wherein requesting access includes providing the URI from the portion of the second multimedia file;

at the server device, checking that a user of the second terminal device is authorized to consume the first multimedia file; and in response to the user of the second terminal device being authorized to consume the first multimedia file, transmitting elements of the complementary file to the first terminal device, wherein:

the elements of the complementary file are transmitted to the first terminal device separately from the second multimedia file, the first terminal device is able to recreate, block by block, a partial synthesis of the parent compressed multimedia file from the second multimedia file only when in possession of the elements of the complementary file, and the first terminal device uses the time-codes from the second multimedia file to recreate the partial synthesis of the parent compressed multimedia file.

2. A method comprising:

at a server device that includes a non-transitory tangible computer-readable medium, creating, from a parent compressed multimedia file having a first format, (i) a first multimedia file having the first format and (ii) a complementary file, wherein:

the parent compressed multimedia file is composed of binary data blocks;

the complementary file includes information on modifications made to the first multimedia file, and creating the first multimedia file includes modifying the parent compressed multimedia file in such a manner that the first multimedia file is rendered unusable without the complementary file;

at the server device, associating the complementary file with a reference that identifies the complementary file;

at the server device, extracting time-codes from the first multimedia file;

at the server device, generating a second multimedia file having the first format and including (i) metadata including the reference and the time-codes and (ii) the first multimedia file;

broadcasting a portion of the second multimedia file to at least one terminal device that includes a non-transitory tangible computer-readable medium, wherein the portion of the second multimedia file includes some or all of the second multimedia file; and at the server device, in response to a request from a first terminal device of the at least one terminal device, selectively transmitting elements of the complementary file to the first terminal device, wherein:

the request includes the reference from the portion of the second multimedia file, the elements of the complementary file are transmitted to the first terminal device separately from the second multimedia file, the first terminal device is able to recreate, block by block, a partial synthesis of the parent compressed multimedia file from the second multimedia file only when in possession of the elements of the complementary file, and the first terminal device uses the time-codes from the second multimedia file to recreate the partial synthesis of the parent compressed multimedia file.

3. The method of claim 2, further comprising:

at the first terminal device, receiving the second multimedia file;

in response to a request by a user of the first terminal device to consume the second multimedia file, initiating a client/server connection between the first terminal device and the server device;

over the client/server connection, verifying by the server device that the user is authorized to consume the second multimedia file; and in response to successful verification, transmitting, block by block, the elements of the complementary file that are used for the recreation of the partial synthesis from the server device to the first terminal device.

4. The method of claim 2, wherein extracting time-codes from the first multimedia file includes extracting at least one time-code per binary data block of the first multimedia file.

5. The method of claim 4, further comprising:

generating an index register table from the first multimedia file by combining the time-codes with indexes representative of a sequence of the parent compressed multimedia file, each sequence being encoded by at least one binary data block of the parent compressed multimedia file; and including the index register table in the metadata of the second multimedia file.

6. The method of claim 2, wherein broadcasting the portion of the second multimedia file includes transmitting the portion of the second multimedia file from the server device.

7. The method of claim 2, wherein broadcasting of the portion of the second multimedia file includes transmitting the portion of the second multimedia file from the first terminal device to at least one another terminal device.

8. The method of claim 2, wherein broadcasting of the portion of the second multimedia file includes writing the portion of the second multimedia file to a physical medium.

9. The method of claim 2, further comprising deciding, at the server device, which elements of the complementary file are to be transmitted to the first terminal device as a function of characteristics of the first terminal device.

10. The method of claim 2, further comprising deciding, at the server device, which elements of the complementary files are to be transmitted to the first terminal device as a function of conditions of utilization imposed by the holder of the rights on the parent compressed multimedia file.

11. The method of claim 2, wherein the recreated partial synthesis is begun upon receiving initial parts of both the portion of the second multimedia file and the elements of the complementary file.

12. The method of claim 2, further comprising editing the second multimedia file to create an extract of the second multimedia file.

13. The method of claim 12, further comprising assembling multiple extracts of the second multimedia file to create a new multimedia file.

14. The method of claim 12, further comprising assembling extracts of a plurality of second multimedia files to create a new multimedia file, the plurality of second multimedia files including the second multimedia file.

15. A system comprising:

a server device, including a non-transitory tangible computer-readable medium, that creates, from a parent compressed multimedia file having a first format, (i) a first multimedia file having the first format and (ii) a complementary file, wherein:

- the parent compressed multimedia file is composed of binary data blocks,
- the complementary file includes information on modifications made to the first multimedia file,
- the first multimedia file is created in such a manner that the first multimedia file is rendered unusable without the complementary file,
- the server device associates the complementary file with a reference that identifies the complementary file,
- the server device extracts time-codes from the first multimedia file,
- the server device generates a second multimedia file having the first format and including (i) metadata including the reference and the time-codes and (ii) the first multimedia file, and
- the server device broadcasts a portion of the second multimedia file, wherein the portion of the second multimedia file includes some or all of the second multimedia file; and a terminal device, including a non-transitory tangible computer-readable medium, that (i) receives the portion of the second multimedia file from the server device and (ii) sends a request for the complementary file to the server device, wherein:

- the request includes the reference from the portion of the second multimedia file,
- the server device selectively responds to the request by transmitting elements of the complementary file to the terminal device,
- the server device transmits the elements of the complementary file to the terminal device separately from the second multimedia file,
- the terminal device is able to recreate, block by block, a partial synthesis of the parent compressed multimedia file from the second multimedia file only when in possession of the elements of the complementary file, and
- the terminal device uses the time-codes from the second multimedia file to recreate the partial synthesis of the parent compressed multimedia file.

16. The system of claim 15, wherein:

in response to the request, the server device verifies that a user of the terminal device is authorized to consume the second multimedia file; and only in response to verification that the user of the terminal device is authorized to consume the second multimedia file, the server device transmits, block by block, the elements of the complementary file that are used for the recreation of the partial synthesis to the terminal device.

17. The system of claim 15, wherein the terminal device disseminates the portion of the second multimedia file to a second terminal device that includes a non-transitory tangible computer-readable medium, and wherein the second terminal device, in response to receiving the portion of the second multimedia file, sends a request for the complementary file to the server device.

18. The system of claim 15, wherein the recreated partial synthesis is begun (i) upon receiving initial parts of both the portion of the second multimedia file and the elements of the complementary file but (ii) before receiving an entirety of both the portion of the second multimedia file and the elements of the complementary file.

* * * * *